United States Patent
White et al.

(10) Patent No.: US 8,602,140 B2
(45) Date of Patent: Dec. 10, 2013

(54) MOTOR CONTROLLER WITH INTEGRATED SAFETY FUNCTION TO ELIMINATE REQUIREMENT FOR EXTERNAL CONTACTOR

(75) Inventors: Roger White, Livermore, CA (US); Stephen Post, Walnut Creek, CA (US)

(73) Assignee: Curtis Instruments, Inc., Livermore, CA (US)

( * ) Notice: Subject to any disclaimer, the term of this patent is extended or adjusted under 35 U.S.C. 154(b) by 0 days.

(21) Appl. No.: 13/437,841

(22) Filed: Apr. 2, 2012

(65) Prior Publication Data
US 2013/0257149 A1  Oct. 3, 2013

(51) Int. Cl.
*B60K 1/00* (2006.01)
(52) U.S. Cl.
USPC ...................................... 180/65.1; 180/65.29
(58) Field of Classification Search
USPC .................. 180/65.1, 65.29, 65.31
See application file for complete search history.

(56) References Cited

U.S. PATENT DOCUMENTS

| | | | |
|---|---|---|---|
| 4,766,273 A | 8/1988 | Butterworth et al. | |
| 4,801,828 A | 1/1989 | Ishikawa et al. | |
| 5,136,219 A | 8/1992 | Takahashi et al. | |
| 5,504,655 A * | 4/1996 | Underwood et al. | 361/707 |
| 6,091,596 A | 7/2000 | Godfrey et al. | |
| 6,348,751 B1 * | 2/2002 | Jermakian et al. | 310/207 |
| 6,459,167 B1 * | 10/2002 | Yamanashi | 307/9.1 |
| 6,804,127 B2 * | 10/2004 | Zhou | 363/37 |
| 7,230,395 B2 * | 6/2007 | Horii | 180/65.29 |
| 7,420,295 B2 * | 9/2008 | Omae et al. | 307/66 |
| 8,022,663 B2 * | 9/2011 | Davis et al. | 320/104 |
| 8,115,457 B2 * | 2/2012 | Balakrishnan et al. | 320/166 |
| 2008/0290842 A1 * | 11/2008 | Davis et al. | 320/166 |
| 2012/0025768 A1 * | 2/2012 | Nakano et al. | 320/116 |
| 2012/0058368 A1 * | 3/2012 | Yamamoto et al. | 429/7 |
| 2012/0330488 A1 * | 12/2012 | Sadler | 701/22 |

* cited by examiner

*Primary Examiner* — Hau Phan
(74) *Attorney, Agent, or Firm* — Beyer Law Group LLP

(57) ABSTRACT

Circuits, systems, and methods are disclosed to eliminate the requirement for an external electromechanical contactor. Integrating contactor circuits with a motor controller reduces cost. Additionally, the cost of the contactor circuit may be reduced by providing transistors designed to block current in only one direction in the event of an electrical fault corresponding to an electrical drive direction.

29 Claims, 11 Drawing Sheets

MOTOR CONTROLLER WITH INTEGRATED SAFETY FUNCTION TO ELIMINATE REQUIREMENT FOR EXTERNAL CONTACTOR

FIELD OF THE INVENTION

The present invention is related to contactors. More particularly, the present invention is directed to replacing electromechanical contactors with solid state circuits.

BACKGROUND OF THE INVENTION

Contactors are commonly used in many battery operated vehicles. Contactors are used to disconnect a system load from a battery. Main contactors used in high amperage battery-powered applications (e.g., 40 A to 800 A for 24-80V battery voltages) conventionally utilize electromechanical switch components due to a combination of considerations, including cost. In particular, electromechanical configurations lend themselves to handling high currents with reasonable component costs. An electromechanical contactor can either be sealed or unsealed, although sealed versions typically cost more.

Main contactors are used in nearly all off highway electric vehicles that run on batteries. They are used primarily as a safety device to disconnect the motor controller(s) in the event of a fault and to prevent arcing when the battery is disconnected and reconnected (e.g. in forklifts during battery changes).

Main contactors can be a source of failures in these vehicles due to contact corrosion, freezing, and vibration. This is particularly true for low cost vehicles that use low quality, unsealed electromechanical contactors. So from a cost and to some degree reliability perspective it would be good to be able to eliminate the main contactor. It also requires extra space in the vehicle and an additional cable.

There exist sealed electromechanical contactors that do not have a problem with contact corrosion or freezing, but these cost more. Solid state contactors that do not have any of the previously mentioned problems also exist, but there are no commercially available solid state contactors designed to handle high currents at a reasonable cost in comparison with electromechanical contactors. In particular, in the prior art the cost of high current solid state contactors is prohibitive. As an illustrative example, in a 400 A application an unsealed electromechanical contactor may cost $20, a sealed electromechanical contactor $30-40, and conventional solid state contactors would cost $100. There are a number of reasons for the high cost of conventional solid state contactors, including the need for a large number of power FETs to provide protection from high currents in both directions in the event of an electrical fault.

For the reasons described above, it would be advantageous if a main electromechanical contactor could be replaced by a solid state solution in a battery power vehicle at a competitive cost point.

SUMMARY OF THE INVENTION

Solid state circuits capable of replacing electromechanical main contactors in battery powered electrical vehicles are disclosed. In one embodiment, circuits implementing a solid state contactor function to disengage the motor controller from a battery are integrated with the motor controller, resulting in a reduction in part count and an improvement in heat sinking which improves performance of the solid state contactor.

The solid state contactor may be implemented to provide protection for both directions of current flow from a battery using an arrangement of back-to-back FETs. Alternatively, protection may be provided in a single direction corresponding to a drive current to the motor controller in order to reduce component cost.

The solid state contactor function may be integrated with other circuits, such as a capacitor discharge circuit, a pre-charge circuit, and logic power circuits as part of a larger control circuit for operating the motor controller and providing protection from various electrical faults and problems associated with battery replacement and battery charging operations. A main power fuse may also be integrated into the controller to provide additional protection.

In one embodiment, an integrated capacitor bank switch is placed in-line with the capacitor bank. The in-line switch provides protection from arcing.

DETAILED DESCRIPTION

The present invention is generally directed to replacing discrete electromechanical main contactors in electrical vehicles, such as off-road battery powered electrical vehicles. Embodiments of the invention include solid-state solutions that address the safety concerns of battery powered electrical vehicles requiring comparatively high amperage (e.g., 40

A-800 A) and at a reasonable cost. Exemplary applications include material handling applications where a variety of safety guidelines are in place for battery powered electric vehicles.

Figure 1:
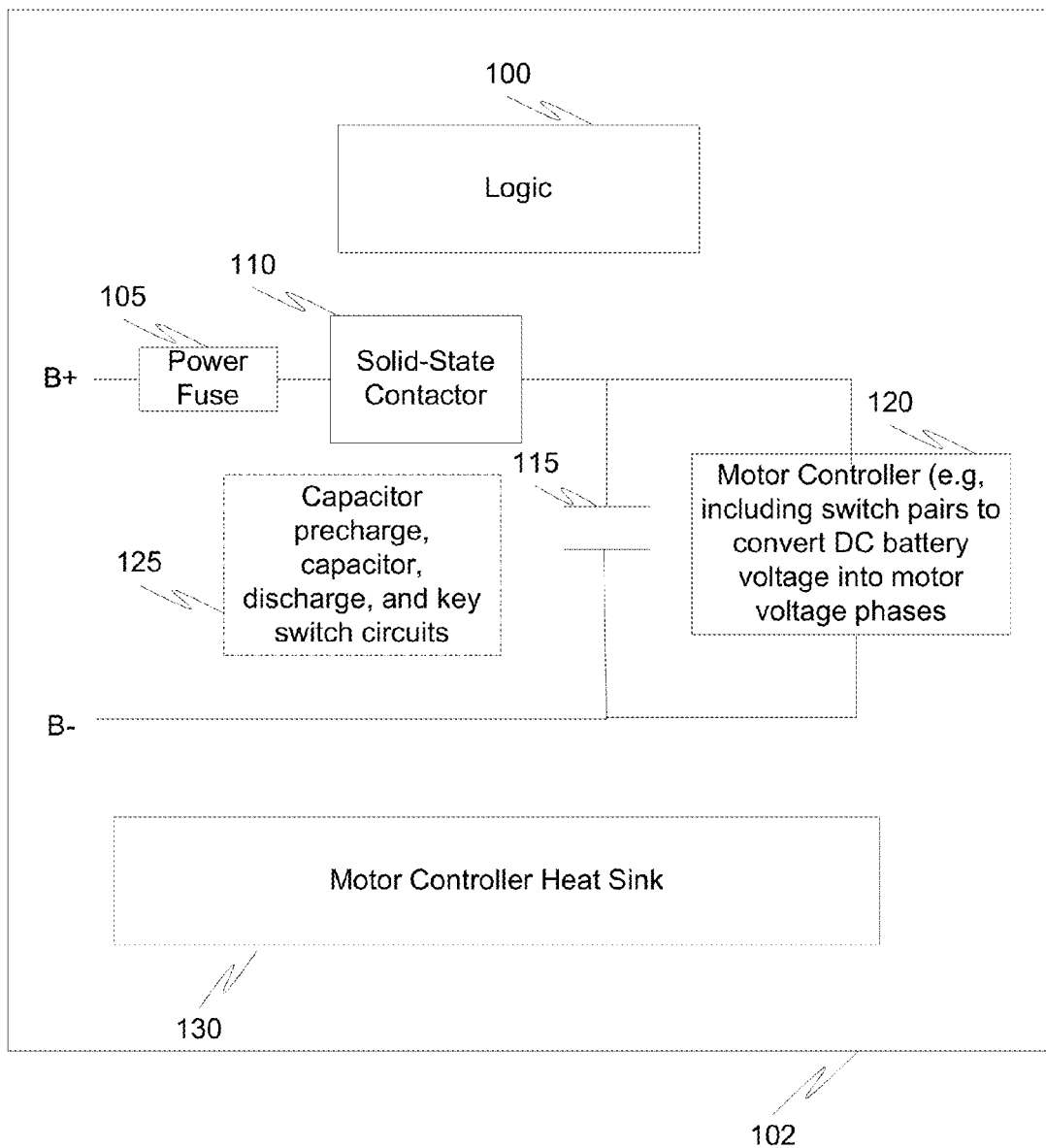
FIG. 1 is a high level block diagram of a solid-state contactor function integrated into a motor controller in accordance with one embodiment of the present invention.

FIG. 1 is a high-level block diagram illustrating a solid-state contactor 110 integrated with other components in a system. Referring to FIG. 1, the present invention is generally directed to a solid-state contactor 110 inside of an enclosure 102 that houses other components such as a power fuse 105. Additionally, the solid state contactor may be integrated with a motor controller 120 having transistor switches (FETs) to convert a DC battery voltage into the voltage phases for one or more motors.

The solid state contactor 110 is used primarily as a safety device to disconnect the motor controller 120 in the event of a fault and to prevent arcing when the battery is disconnected and reconnected in an electric powered vehicle (e.g. in forklifts during battery changes). A capacitor bank 115 includes at least one capacitor to filter the voltage for the motor controller. An arc may occur because capacitor 115 (typically a capacitor bank) inside the motor controller needs to be charged to the same level as the battery voltage. To prevent arcing, the internal capacitor bank 115 needs to be discharged when the battery is disconnected and then precharged back to the battery voltage before turning on when the battery is reconnected. Also in the event the battery is connected in reverse polarity, a power fuse 105 is preferably included as an additional safety component and sized to provide protection from a reverse polarity condition.

The solid state contactor 110 has on and off states. In an on-state, a capacitor 115 (or a capacitor bank) and the motor controller 120 is electrically coupled through the solid-state contactor and the power fuse 105 to the battery nodes B+ and B−. When the solid-state contactor is in an off-state, additional protection is provided against electrical faults, arcing, or other safety concerns associated with uncontrolled current flowing into motor controller 120.

In an integrated vehicle solution the capacitor 115 may be initially precharged before operating the motor controller and discharged when the motor controller is not in use, which may be controlled by the position of a key switch. Thus, in an integrated system there are also capacitor precharge, capacitor discharge, and key switch circuits 125. Additionally, the contactor 110 needs to have its operation coordinated with other components and be placed in an off-state during specific states and turned on during one or more states when it is necessary for proper operation of the motor controller 120. Additional logic 100, such as microprocessor-based logic, is provided to operate transistor switches and perform other control or monitoring operations for the motor controller 120.

Performance of the solid state contactor 110 is improved by thermally coupling it to a heat sink 130 of the motor controller, such as through mounting components to an Insulated Metal Substrate (IMS) coupled to the heat sink or by attaching the solid state contactor 110 to a heat-sink rail of a main heat sink for the motor controller.

The use of a solid state contactor 110 eliminates the need for additional power cables associated with discrete main electromechanical contactors. Additionally, since the solid state contactor 110 may be enclosed with the motor controller, it is protected, thus eliminating the safety concerns associated with conventional unsealed electromechanical contactors.

Several different circuit implementations are contemplated. For example, the solid state contactor 110 may be in line with either the B+ or B− connection (where "B+" and "B−" are positive and negative battery polarity nodes, respectively). In motor controllers where failure of the power base can not cause a runaway (e.g. AC, Permanent Magnet AC (PMAC), Brushless DC (BLDC)) the solid state contactor 110 only needs to control the connection to the capacitor bank 115 in the motor controller which can result in a further reduction in cost. Additionally, different implementations and arrangements of the solid state contactor 110 are contemplated.

Figure 2:
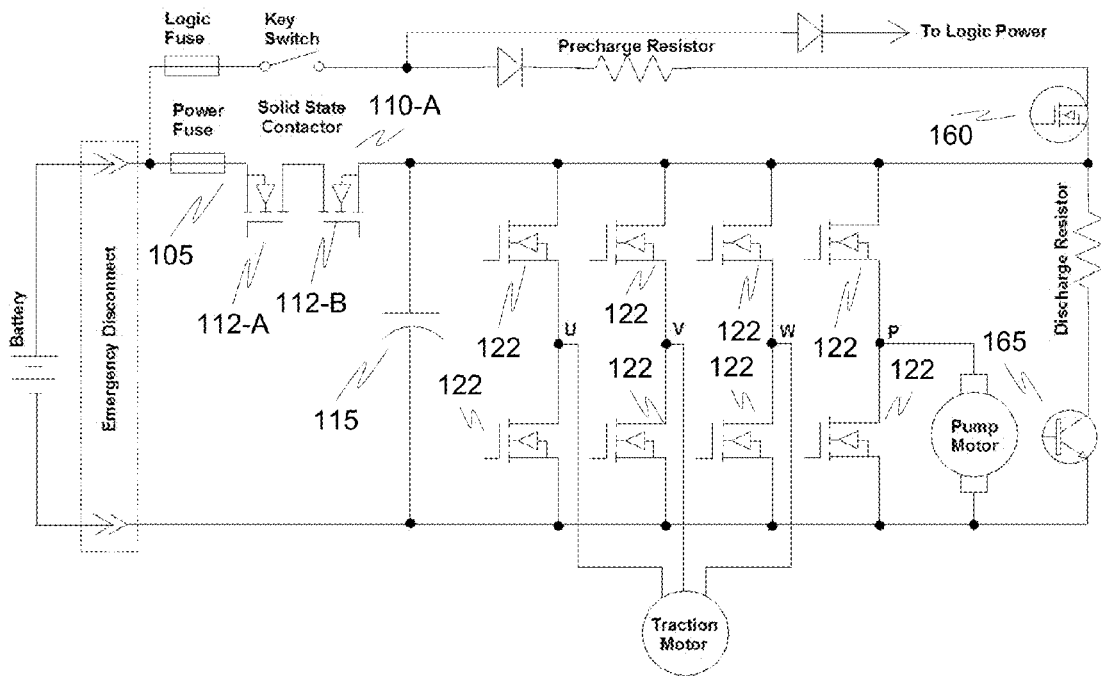
FIG. 2 is a circuit diagram illustrating a solid state contactor operable to block current in two directions that is integrated with a motor controller in accordance with an embodiment of the present invention.

FIG. 2 is a circuit diagram illustrating a first circuit implementation of a solid state contactor 110-A with the heat sink 130 omitted for clarity. This implementation has an integrated power fuse 105 and two back-to-back FETs 112-A and 112-B serving as a solid state contractor 110-A. The two MOSFETS 112-A and 112-B (or parallel banks) are connected in a "back to back" series configuration to block current in both directions to ensure no leakage current can flow when the switches are off. As is well known in the transistor art, there is an inherent diode in FETs that conducts in a reverse direction, which means that a single FET cannot completely block current in two directions. The solid-state contactor 110-A controls the connection to a capacitor bank 115 in the motor controller. The motor controller includes other FET power-switches of the motors, such as switch-pairs 122 arranged in conventional half-bridge arrangements between the positive and negative rails to generate individual voltage phases of a motor, such as U, V, W voltages of a traction motor and a P voltage for a pump motor. That is, operation of the switches 122 can be used to couple the U, V, W, and P nodes to either a positive or negative battery potential, depending on the portion of the cycle of the voltage phase. Other electronics may include a precharge resistor and a precharge switch 160, a discharge resistor and a discharge switch 165, and a key switch. In particular when the solid state contactor is off and the discharge switch 165 is on then the capacitor 115 will be discharged. When solid state contactor is off, and the key switch and precharge switch 160 are on then a circuit path is formed to precharge the capacitor 115. Microprocessor logic (not shown) may also be included to control individual switches.

Further cost reductions can be achieved by modifying the solid-state contactor 110 such that it blocks current in only one direction in the off-state. This is based on the observation by the inventor that for electric vehicles the relevant safety regulations for many applications (e.g., UL-583 and EN-1175 for material handling vehicles) can be satisfied if the vehicle stops moving in the event of a fault. Thus, in many applications the solid state contactor 110-A only needs to block current in the drive direction (flow out of the battery to the motor controller) when the switch is off to satisfy a safety requirement that the vehicle is required to stop moving in the event of a fault. In contrast, current flow in the other direction to the battery (regenerative braking) is permissible in many applications because it can only cause the vehicle to reduce speed. This allows the cost of the solid contactor to be cut in half as only one MOSFET (or parallel bank) is required. Other portions of the system provide additional protection from electrical problems. When the vehicle is shut down and batteries are being changed, the discharge circuitry discharges the capacitor prior to a battery swap, thus providing an additional measure of safety. The integrated power fuse 105, as previously described, can be used to provide an additional level of safety for other concerns, such as a battery being connected in a reverse polarity state.

Figure 3:
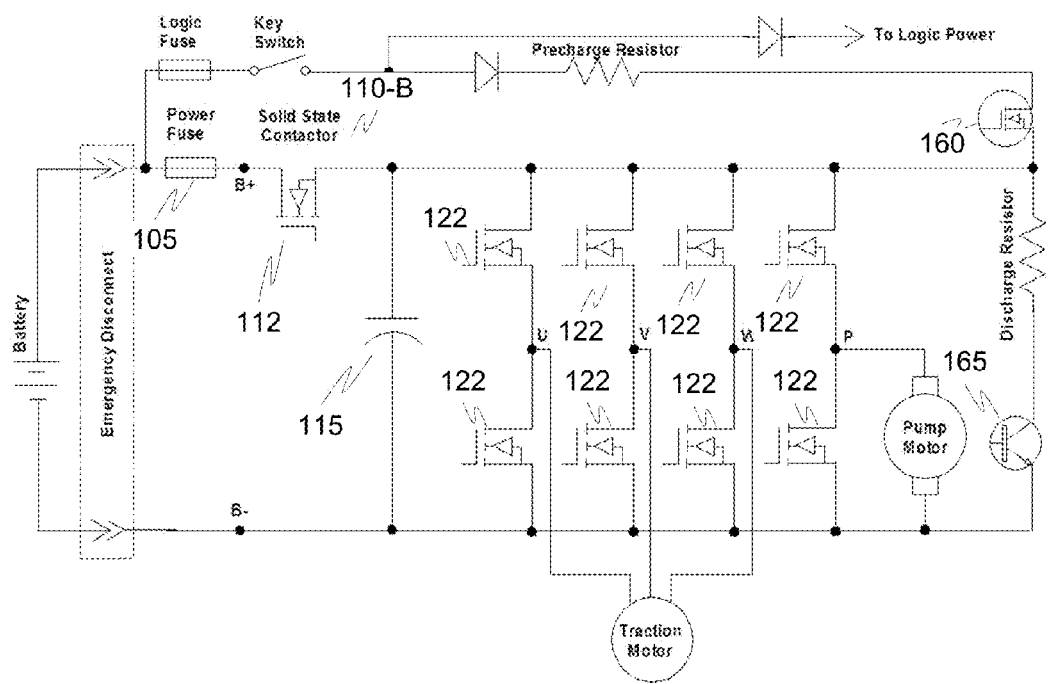
FIG. 3 is a circuit diagram illustrating a solid state contactor coupled to a positive battery node that is operable to block current from the battery and which is integrated with a motor controller in accordance with an embodiment of the present invention.

FIG. 3 illustrates an integrated B+ contactor switch implementation. A contactor 110-B only needs to block current in the drive direction (when the switch is off) corresponding to current flowing out of the battery because in many vehicle applications current flow in a regenerative braking direction (towards the battery) results in a vehicle reducing speed. Consequently, in this implementation, there is only a single FET 112 (or parallel bank of FET's) oriented to block current flow from the battery when the FET-112 is in an off-state. Note that the discharge circuitry is configured and operated such that the capacitor bank 115 is automatically discharged when the key switch is turned off. As a result, swapping batteries is not a problem since the capacitor bank is automatically discharged when the key is switched off. Additional protection is provided by proper fuse selection such that a reverse battery polarity situation can be handled by the fuse. This allows the use of a single bank of FETs rather than back-to-back FETs because in an integrated solution all of the main safety concerns are addressed.

Figure 4:
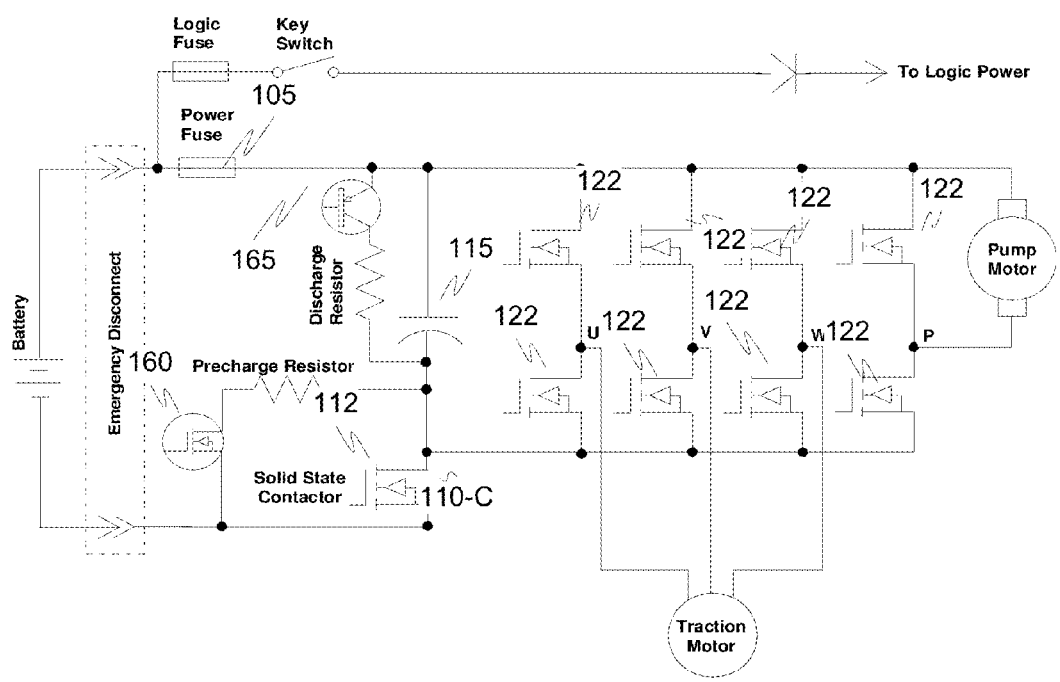
FIG. 4 is a circuit diagram illustrating a solid state contactor coupled to a negative battery node that is operable to block current from the battery and which is integrated with a motor controller in accordance with an embodiment of the present invention.

FIG. 4 illustrates an integrated B− contactor switch configuration. In this circuit implementation, the solid state contactor 110-C is placed on the B− side. The precharge resistor and precharge switch are moved as well as the discharge resistor and discharge switch. This configuration of the solid state contactor potentially simplifies some of the gate drive requirements; however it is also a larger change from existing motor controller designs. As in the embodiment of FIG. 3, a single bank of FETs 112 is provided for the solid state contactor to block current flowing from the battery to the motor controller when the contactor is in an off state.

Figure 5:
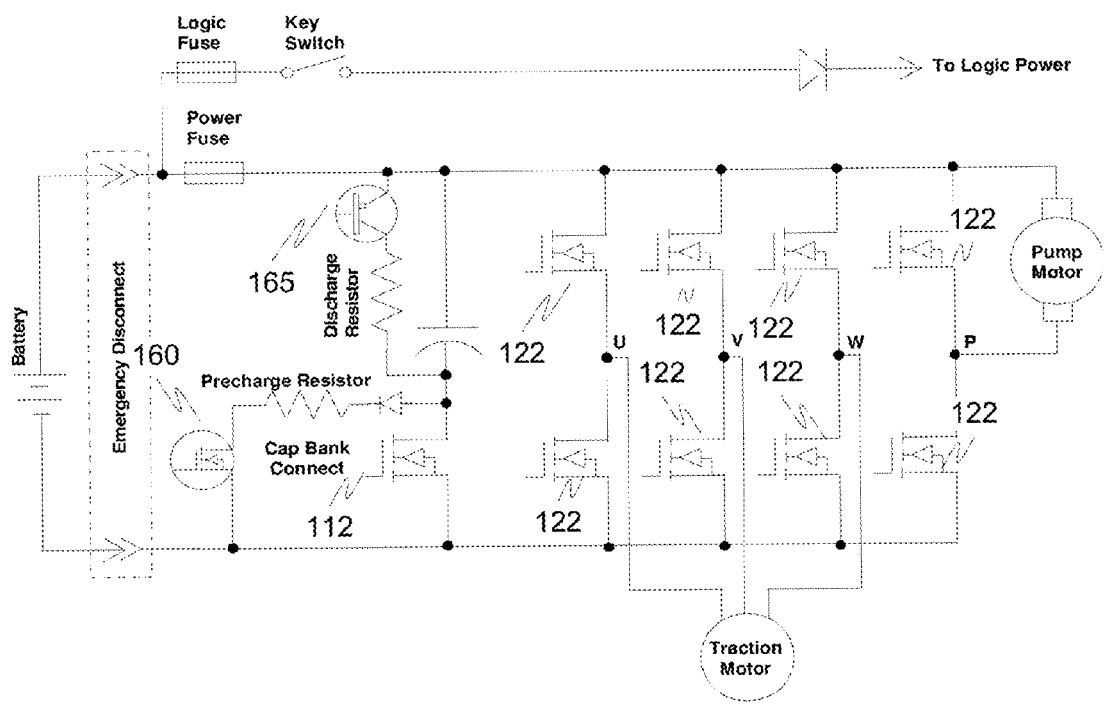
FIG. 5 is a circuit diagram illustrating a capacitor bank connect switch integrated with a motor controller in accordance with an embodiment of the present invention.

FIG. 5 illustrates an integrated capacitor bank switch configuration. A capacitor bank switch is in line with the main capacitor bank and provides protection from arcing and satisfies international safety requirements for certain AC motor designs. This approach has the disadvantage of increasing the effective series resistance (for normal current flow to the motor controller), but has the advantage that it may be easier to incorporate into existing designs. Additionally, it puts the stress to blow the power fuse under reverse polarity conditions across the largest bank of FETs. This implementation also allows a smaller switch to be used for the capacitor bank connect than in the solid state contactor cases.

Figure 6:
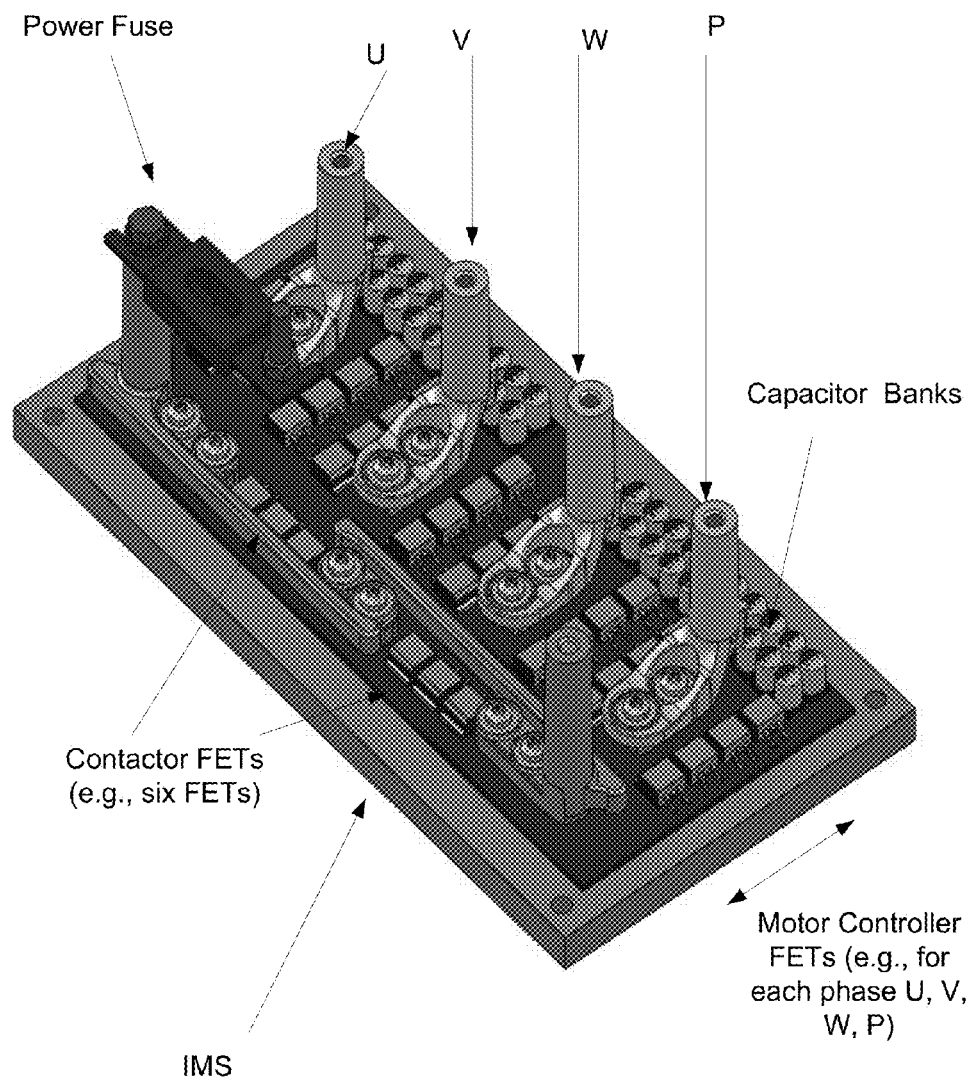
FIG. 6 illustrates integration of contactor components and motor controller components on a common insulated metal substrate in accordance with an embodiment of the present invention.
Figure 7:
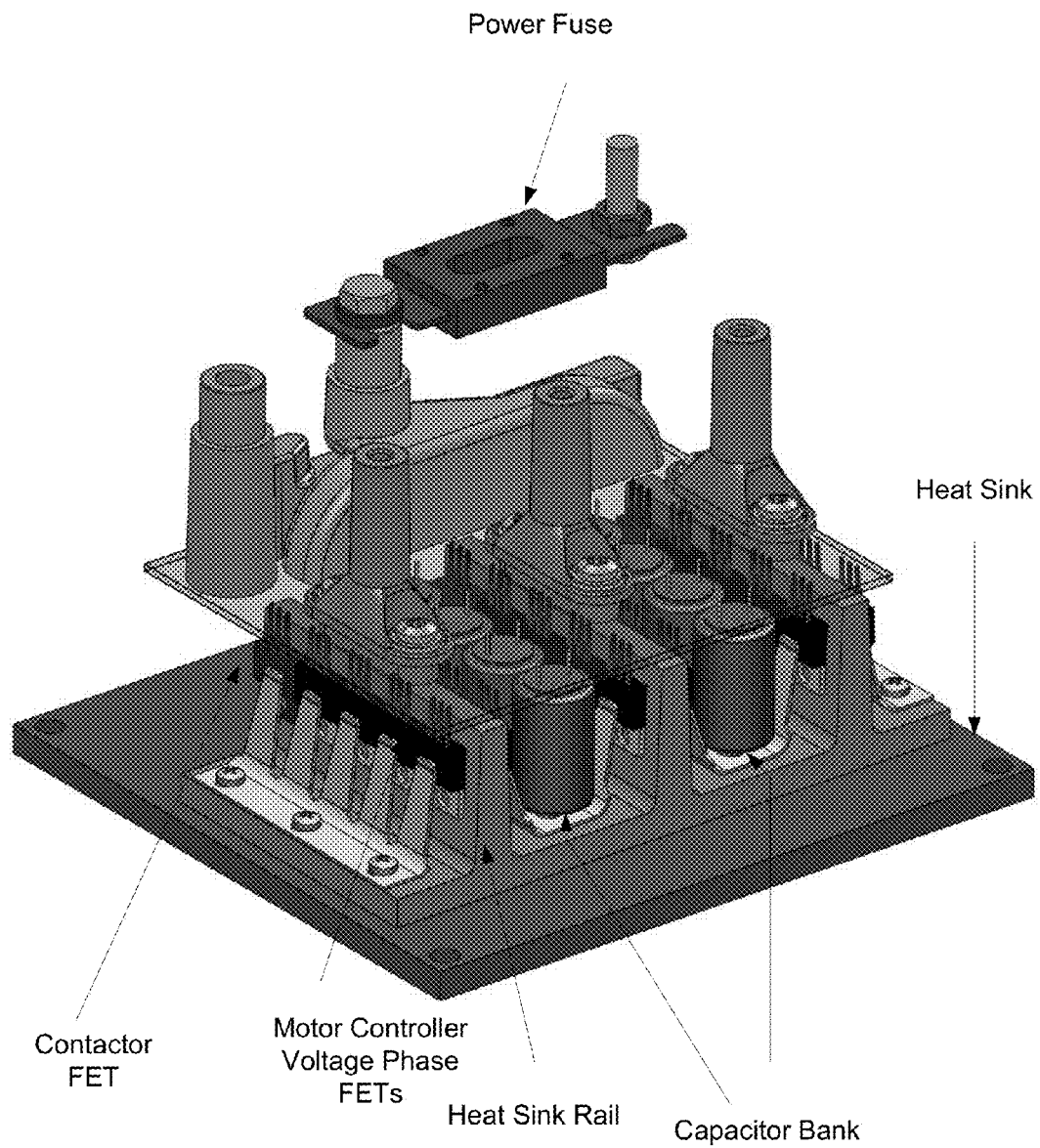
FIG. 7 illustrates mounting of contactor components on rails of a motor controller in accordance with an embodiment of the present invention.

FIGS. 6-7 illustrate two different exemplary heat sinking configurations. FIG. 6 illustrates an insulated metal substrate design which may comprise a set of layers including a copper surface, an insulating layer, and an aluminum substrate. A power fuse is illustrated, along with a capacitor bank, U, V, W, and P motor controller voltage phase posts, contactor FETs, and motor controller phase FETs. The use of an insulated metal substrate design provides for efficient thermal path to a common heat sink of the motor controller. FIG. 7 illustrates an embodiment in which the contactor FETs are mounted to the sides of rails as well as the voltage phase FETs. The capacitor banks are disposed in the gaps between the rails.

The maximum current for a MOSFET is heat limited. Heat sinking the solid state contactor 110 to a main heat sink for the motor controller provides many benefits. For example, in an insulated metal substrate design, an individual FET can handle up to about 70 A. In contrast, for a conventional copper board a similar FET could handle about 10 A. Proper attention to heat sinking considerations and integrating the solid-state contactor with the heat sink of the main motor controller thus also permits a reduction in the number of FETs required in a solid-state contactor. As a result, an unexpected benefit of integrating the solid state contactor with the main motor controller is a dramatic decrease in component costs compared with utilizing a separate discrete solid state contactor as a direct replacement for a main electromechanical contactor designed to handle high currents (e.g., 40 A-800 A). Integrating a solid state contactor into the main motor controller also reduces cabling costs. Moreover, as described in regards to the examples of FIGS. 3-5, the solid state contactor can be designed to block current in only one direction out from the battery, thus further reducing material costs.

As a consequence of a combination of these features, the integration of a solid state contactor with a motor controller in accordance with the present invention permits a cost-effective solution for replacing high amperage electromechanical contactors. This result is unexpected given that the battery powered vehicle industry has utilized electromechanical contactors because high current electromechanical are significantly cheaper than discrete solid state contactors. As an illustrative example, in a 400 A application an unsealed electromechanical contactor may cost $20, a sealed electromechanical contactor $30-40, and conventional discrete solid state contactors would cost $100. In accordance with the present invention, integrating the solid state contactor with the motor controller permits a dramatic reduction in cost that is unexpected in view of the prior art, making the use of solid state contactors practical for the first time in many commercial battery powered vehicle applications. Estimates by the inventor indicate that the contactor function may be achieved in an integrated solution for as little as $10-15, which is an unexpected result because the paradigm in the industry is that unsealed contactors are the lowest cost solution for high current applications. Additionally, an integrated solution also permits an electric vehicle to comply with relevant safety standards, such as the UL-583 and EN-1175 safety standards for material handling vehicles. Consequently, embodiments of the present invention can be implemented that are cheaper and safer than unsealed electromechanical contactors used for electrical vehicles operation in current ranges of 40 A-800 A and common battery voltages (e.g., 24V-80V).

An exemplary start-up and shut down sequence is illustrated in the following sequence table. The solid state contactor is in an off state during exemplary states 1-5 and 8. Thus, for example, the solid state contactor is in an off state during discharge and precharge states and is also off when the key switch is off. The solid state contactor is turned on in states 6-7, where state 7 is a state where the motor drive is enabled and state 6 is a preparatory state to turn the solid state contactor on prior to enabling the motor drive. Thus in states 1-5 and 8 the solid state contactor is in an off-state and will block current flow in at least a direction corresponding to a flow of current from the battery towards the motor controller.

Sequence Table
Typical Start-up and Shut-down Sequence

| # Description | Battery | KSI | Solid State Contactor | Pre-charge | Dis-charge | Motor Drive (U, V, W, P) |
|---|---|---|---|---|---|---|
| 1 Battery disconnected, system shut down | Disconnected | Off | Off | Off | On | Disabled |
| 2 Battery connected, no current flows | Connected | Off | Off | Off | On | Disabled |

Sequence Table
Typical Start-up and Shut-down Sequence

| # Description | Battery | KSI | Solid State Contactor | Pre-charge | Dis-charge | Motor Drive (U, V, W, P) |
|---|---|---|---|---|---|---|
| 3 KSI turned on, current flows to logic section | Connected | On | Off | Off | Off | Disabled |
| 4 Precharge turns on and current flows to cap bank | Connected | On | Off | On | Off | Disabled |
| 5 Precharge turns off after cap bank charged | Connected | On | Off | Off | Off | Disabled |
| 6 Solid state contactor turns on connecting battery to cap bank | Connected | On | On | Off | Off | Disabled |
| 7 Motor drives start to work and current flows from battery to controller. | Connected | On | On | Off | Off | Enabled |
| 8 KSI turns off, controller shuts down and discharges cap bank | Connected | Off | Off | Off | On | Disabled |

Figure 8:
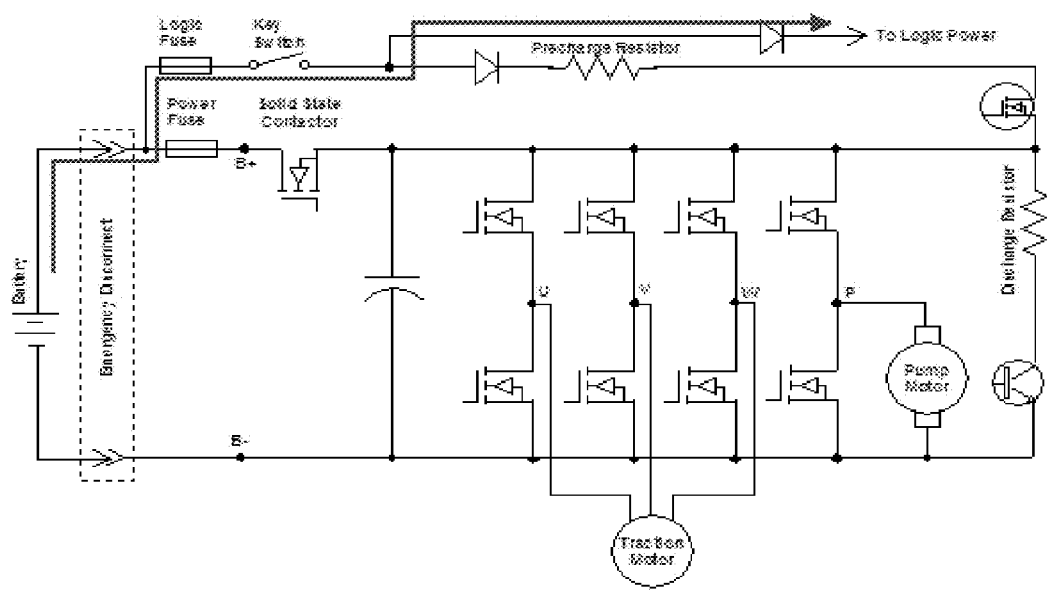
FIG. 8 illustrates current flow to logic power in a state of operation of the circuit of FIG. 3.
Figure 9:
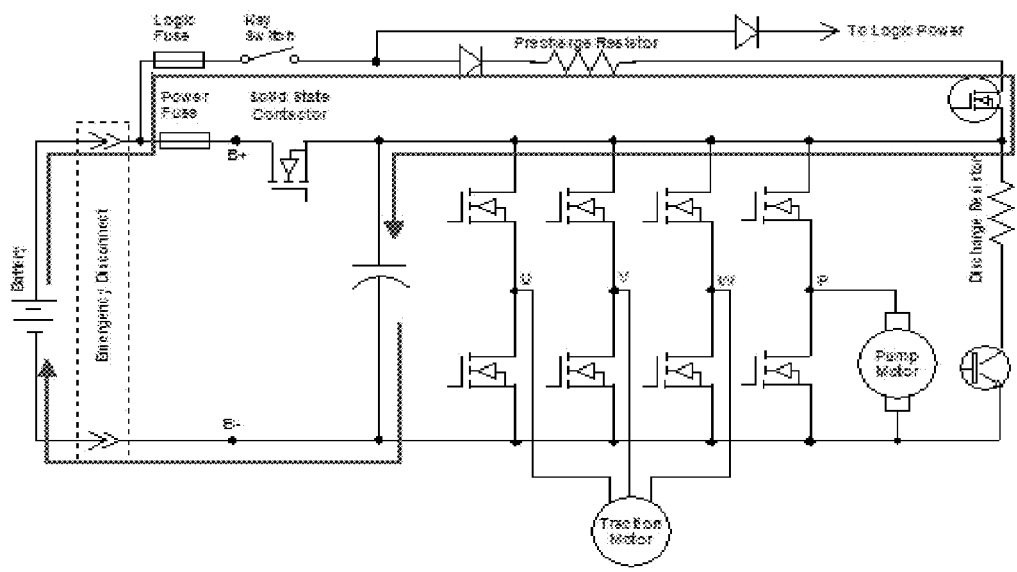
FIG. 9 illustrates current flow in a capacitor precharge state of operation of the circuit of FIG. 3.
Figure 10:
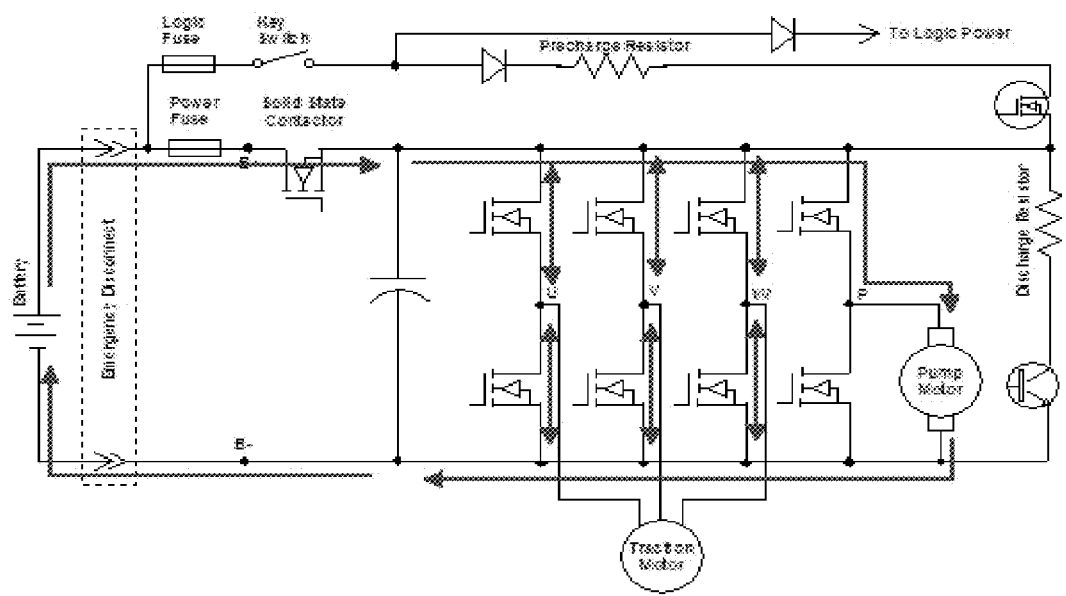
FIG. 10 illustrates current flow in a motor controller enabled state of the circuit of FIG. 3.
Figure 11:
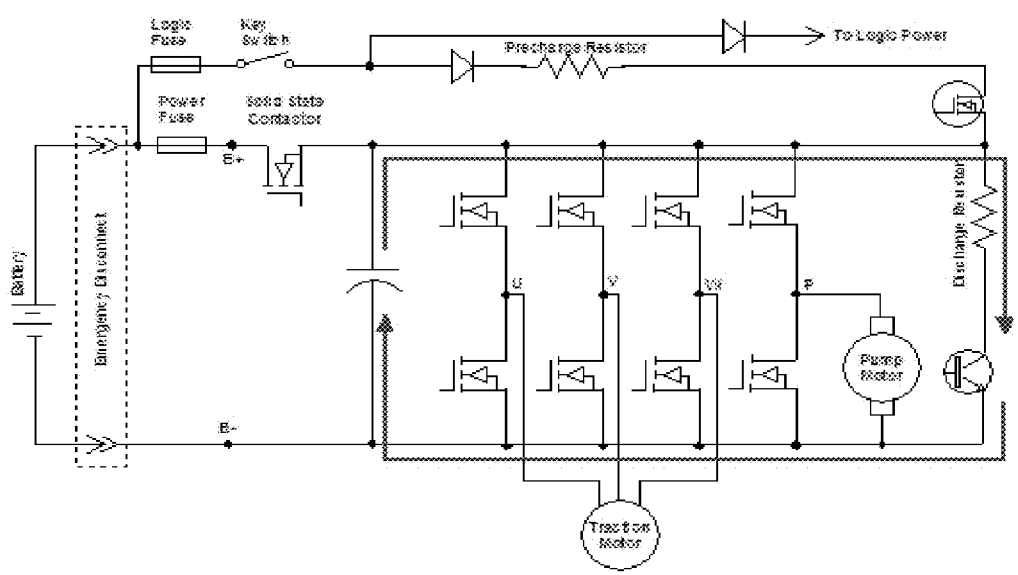
FIG. 11 illustrates current flow in a capacitor discharge state of operation of the circuit of FIG. 3.

FIGS. 8-11 illustrate exemplary current paths in selected states where current flows of the start-up and shut-down sequence for the embodiment of FIG. 3. FIG. 8 illustrates how after the key switch is turned on current flows to the logic power section. FIG. 9 illustrates current paths when the precharge turns on and current flows to the capacitor bank. FIG. 10 illustrates how the motor drive starts to work and current flows from the battery to the motors. FIG. 11 illustrates the key switch turned off and the discharge circuit turns on to discharge the capacitor bank.

While embodiments of the present invention have been described in regards to application for battery powered electrical vehicles, it will be understood that more generally the present invention may be applied for other applications in which a contactor function is required for operating one or more electrical motors.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

As previously described, the operation of the FETs is controlled by a logic unit, which may, for example, include a microprocessor. In accordance with the present invention, the components, process steps, and/or data structures associated with the logic of the system may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The control for the solid state contactor of the present invention may also be tangibly embodied as a set of computer instructions stored on a computer readable medium, such as a memory device.

What is claimed is:

1. A controller for a battery powered electric vehicle, comprising:
   a motor controller to generate at least one voltage phase for at least one motor;
   a capacitor bank filtering battery voltage for the motor controller;
   a discharge circuit to discharge the capacitor bank for at least one battery condition, including at least one of a battery disconnection condition and a battery reconnection condition;
   a precharge circuit to precharge capacitor bank during at least one state;
   a protection circuit coupled to the capacitor bank and providing protection from at least a single direction of current flow in the event of an electrical fault disengaging the battery from the motor controller and blocking current flow in one direction to the capacitor bank;
      wherein the protection circuit provides protection from only one direction of current flow corresponding to a vehicle drive direction; and
   the protection circuit and the motor controller integrated in a common enclosure.

2. The controller of claim 1, wherein the protection circuit is a solid-state contactor.

3. The controller of claim 2, wherein the solid state contactor has transistors providing protection for only one direction of current flow corresponding to flow from the battery to the motor controller in the vehicle drive direction.

4. The controller of claim 1, where the protection circuit includes one or more transistors in-line with the capacitor bank.

5. A controller for at least one motor of an electric vehicle, comprising:
   a positive battery input node and a negative battery input node;
   a capacitor bank comprising at least one capacitor to filter the battery voltage for a motor controller including a set of motor controller switches configured to generate at least one voltage phase for at least one motor;
   a solid state contactor operable to disengage a system load associated with the motor controller from the battery when the solid state contactor is in an off-state wherein the solid state contactor, in an off-state, blocks current in only one direction corresponding to a vehicle drive direction; and a heat sink, wherein the motor controller switches and the solid state contactor are housed in a common enclosure and thermally coupled in common to the heat sink.

6. The controller of claim 5, further comprising a precharge circuit, a discharge circuit, and a key switch, wherein the solid state contactor is in an off-state during at least a precharge state, a discharge state, and a keyswitch off state.

7. The controller of claim 5, wherein the solid-state contactor comprises back-to-back FETs.

8. The controller of claim 5, wherein the solid state contactor comprises FETs configured in the off-state to block current in only one direction corresponding to the vehicle drive direction.

9. The controller of claim 8, wherein the solid state contactor is coupled between the positive battery node and the capacitor bank.

10. The controller of claim 5, wherein the solid state contactor is coupled between the negative battery node and a node of the capacitor bank.

11. The controller of claim 5, further comprising a power fuse.

12. The controller of claim 5, wherein the solid state contactor is configured to handle currents in the range of 40 A to 800 A.

13. The controller of claim 5, wherein the solid state contactor is configured to handle a current greater than 40 A.

14. A controller for at least one motor of an electric vehicle, comprising:
a positive battery input node and a negative battery input node;
a capacitor bank to filter the battery voltage for a motor controller including a set of motor controller switches configured to generate a set of motor voltage phases;
a power fuse;
a solid state contactor to electrically disconnect the motor controller from the battery nodes to protect the electrical vehicle when the solid state contactor is in an off-state, wherein the contactor includes a set of FET switches configured to provide protection only for current flowing in a vehicle drive direction; and
a heat sink, wherein the motor controller switches and the solid state contactor are thermally coupled to the heat sink.

15. The controller of claim 14, further including a precharge circuit to precharge the capacitor bank.

16. The system of claim 15, wherein the system is integrated with the motor controller.

17. The system of claim 16, wherein the system is thermally coupled to a heat sink of the motor controller.

18. The controller of claim 14, further including a discharge circuit to discharge the capacitor bank.

19. The controller of claim 14, wherein the solid state contactor is coupled between the positive battery node and the capacitor.

20. The controller of claim 14, wherein the solid state contactor is coupled between the negative battery node and a node of the capacitors coupled to one side of the set of motor controller switches.

21. The controller of claim 14, wherein the FETs of the solid state contactor share the heat sink of FETs of the motor controller.

22. The controller of claim 14, wherein the contactor is switched on in a state when the motor controller is engaged and switched off to block current in at least one other state of operation.

23. A system including a motor controller and additional safety components, comprising:
a solid state contactor including a bank of FETs for the motor controller, the FET's oriented to block current in an off-state to the motor controller in a single direction corresponding to a vehicle drive direction but not in an opposite regenerative braking direction; and
a discharge circuit configured to discharge a capacitor bank when a key switch is off;
a precharge circuit configured to charge a capacitor bank in a startup mode;
a power fuse to protect the motor controller from a reverse battery polarity condition; and
logic configured to turn the solid-state contactor on in at least one state in which a key switch is on and the capacitor is not being discharged or precharged.

24. The system of claim 23, wherein the solid state contactor is coupled between a positive battery node and the capacitor.

25. The system of claim 23, wherein the solid state contactor is coupled between a negative battery node and a node of the capacitors coupled to one side of the set of motor controller switches.

26. The system of claim 23, wherein the solid state contactor is in-line between the capacitor and the negative battery node where the negative battery node is coupled to one side of the set of motor controller switches.

27. A method of protecting a battery powered electric vehicle having a capacitor bank and a motor controller, comprising:
activating a discharge circuit when a key switch is off to discharge the capacitor for at least one battery condition, including at least one of a battery disconnection condition and a battery reconnection condition;
protecting the motor controller from a reverse battery polarity condition via a power fuse; and
protecting the electric vehicle in an electrical fault condition from undesired current flow in a vehicle drive direction but not in a regenerative braking direction via a solid-state circuit comprising a solid state contactor having transistors blocking current in only a vehicle drive direction.

28. The method of claim 27, wherein the solid state circuit comprises a solid-state switch in-line with the capacitor.

29. A controller for at least one motor of an electric vehicle, comprising:
a positive battery input node and a negative battery input node;
a capacitor bank comprising at least one capacitor to filter the battery voltage for a motor controller including a set of motor controller switches configured to generate at least one voltage phase for at least one motor; and
solid state contactor means to disengage a system load associated with the motor controller from the battery when the solid state contactor is in an off-state by blocking current in only one direction corresponding to a vehicle drive direction.

* * * * *